United States Patent
Jansson Kragh

(10) Patent No.: US 12,208,555 B2
(45) Date of Patent: *Jan. 28, 2025

(54) EXTRUSION AND/OR PULTRUSION DEVICE AND METHOD

(71) Applicant: Reliefed AB, Varberg (SE)

(72) Inventor: Mark Jansson Kragh, Varberg (SE)

(73) Assignee: RELIEFED AB (SE)

( * ) Notice: Subject to any disclaimer, the term of this patent is extended or adjusted under 35 U.S.C. 154(b) by 130 days.

This patent is subject to a terminal disclaimer.

(21) Appl. No.: 17/607,184

(22) PCT Filed: May 5, 2020

(86) PCT No.: PCT/SE2020/050451
§ 371 (c)(1),
(2) Date: Oct. 28, 2021

(87) PCT Pub. No.: WO2020/226556
PCT Pub. Date: Nov. 12, 2020

(65) Prior Publication Data
US 2022/0242029 A1     Aug. 4, 2022

(30) Foreign Application Priority Data

May 6, 2019     (SE) ................... 1950537-9

(51) Int. Cl.
*B29C 48/35*     (2019.01)
*B21C 23/14*     (2006.01)
(Continued)

(52) U.S. Cl.
CPC ............ *B29C 48/35* (2019.02); *B21C 23/142* (2013.01); *B21C 25/02* (2013.01); *B29C 48/301* (2019.02); *B29C 70/526* (2013.01)

(58) Field of Classification Search
CPC ..... B29C 48/35; B29C 70/526; B29C 48/301; B29C 55/30; B29C 48/156;
(Continued)

(56) References Cited

U.S. PATENT DOCUMENTS 828,878   A  *  8/1906  Corinne ................. A47L 13/20
                                                                    15/229.1
2,207,420 A  *  7/1940  Thomas ................... E06B 9/36
                                                                    160/133
(Continued)

FOREIGN PATENT DOCUMENTS

CN     1735498      2/2006
EA     000290 B1    2/1999
(Continued)

OTHER PUBLICATIONS

Extended European Search Report for Application No. 20802054, PCT/SE2020050449, dated Dec. 15, 2022, 8 pgs., European Patent Office, Germany.
(Continued)

*Primary Examiner* — Jeffrey M Wollschlager
(74) *Attorney, Agent, or Firm* — McDonald Hopkins LLC

(57) ABSTRACT

An extrusion-or pultrusion device for forming a profile product in a production direction comprising:
a rotating die having two opposite first and second side walls and an outer circumferential surface there between, wherein the rotating die comprises a first side portion in connection to the first side wall and a second side portion in connection to the second side wall and a mid-portion extending between the first and second side portion, wherein the width of the first channel section is, at least along a portion of its length and at least along a portion of its height, less than a distance between the two opposite side walls of the rotating die.

30 Claims, 14 Drawing Sheets

(51) Int. Cl.
    *B21C 25/02*    (2006.01)
    *B29C 48/30*    (2019.01)
    *B29C 70/52*    (2006.01)

(58) Field of Classification Search
    CPC ... B29C 48/2883; B21C 23/142; B21C 25/02; B21C 3/08; B21C 23/14; B21J 5/12
    See application file for complete search history.

(56) References Cited

U.S. PATENT DOCUMENTS

| | | | | |
|---|---|---|---|---|
| 3,060,512 | A * | 10/1962 | Martin | B29C 44/3442 |
| | | | | 425/374 |
| 3,394,431 | A * | 7/1968 | Nalle, Jr. | B29C 48/08 |
| | | | | 425/327 |
| 3,782,872 | A * | 1/1974 | Nalle, Jr. | B29C 48/05 |
| | | | | 425/382 N |
| 3,795,386 | A | 3/1974 | Carter et al. | |
| 3,825,391 | A | 7/1974 | Davis | |
| 4,074,557 | A | 2/1978 | Yanagimoto et al. | |
| 6,474,966 | B1 * | 11/2002 | Behrens | B29C 48/35 |
| | | | | 425/367 |
| 6,478,564 | B1 | 11/2002 | Tieu et al. | |
| 9,855,702 | B1 | 1/2018 | Olberg et al. | |
| 2005/0161855 | A1 * | 7/2005 | Brown | B29C 43/22 |
| | | | | 425/371 |
| 2006/0099289 | A1 * | 5/2006 | Fukumura | B29C 48/301 |
| | | | | 264/177.1 |
| 2013/0334729 | A1 * | 12/2013 | Denavit | B29C 43/46 |
| | | | | 264/172.14 |

FOREIGN PATENT DOCUMENTS

| | | |
|---|---|---|
| EP | 0958121 | 11/1999 |
| EP | 1272330 | 1/2003 |
| EP | 1543938 | 6/2005 |
| EP | 1717012 | 11/2006 |
| FR | 2130986 | 11/1972 |
| JP | 01241336 | 9/1989 |
| JP | S49-034461 | 1/1991 |
| JP | S52-057070 | 1/1993 |
| WO | 2009069081 A1 | 6/2009 |
| WO | 2017007410 | 1/2017 |
| WO | 2017007411 | 12/2017 |

OTHER PUBLICATIONS

Extended European Search Report for Application 20802488.5, PCT/SE2020050450, dated Jan. 2, 2023, 8 pgs., European Patent Office, Germany.

Extended European Search Report for Application 20802267.3, PCT/SE2020050451, dated Dec. 23, 2022, 8 pgs., European Patent Office, Germany.

Japan Patent Office (JPO), Notification of Reasons for Rejection for Patent Application No. 2021-560931, drafted Dec. 27, 2022, mailed Jan. 5, 2023, Third Patent Examination Department, Japan.

Japan Patent Office (JPO), Notification of Reasons for Rejection for Patent Application No. 2021-560727, drafted Dec. 27, 2022, mailed Jan. 5, 2023, Third Patent Examination Department, Japan.

Patent Cooperation Treaty (PCT), International Search Report and Written Opinion for Application PCT/SE2020/050451 filed May 5, 2020, mailed Jun. 29, 2020, International Searching Authority, SE.

* cited by examiner

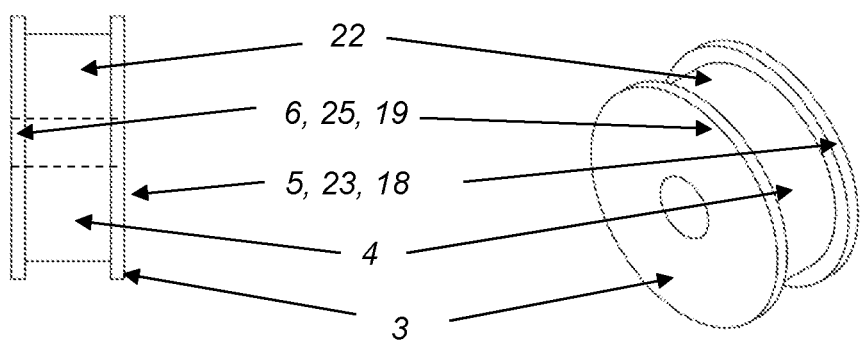
*Fig. 3a*  *Fig. 3b*
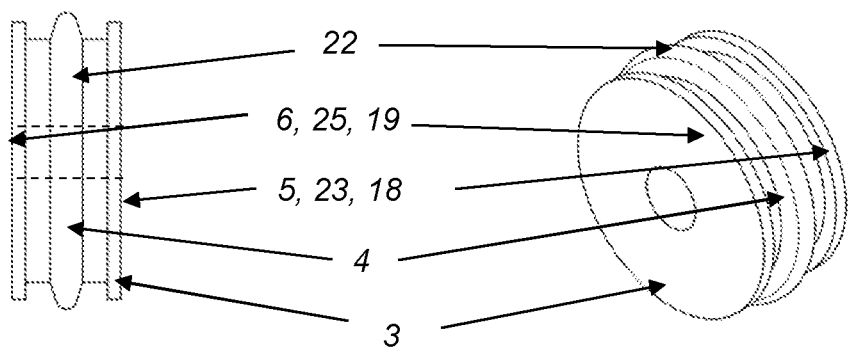
*Fig. 3c*  *Fig. 3d*

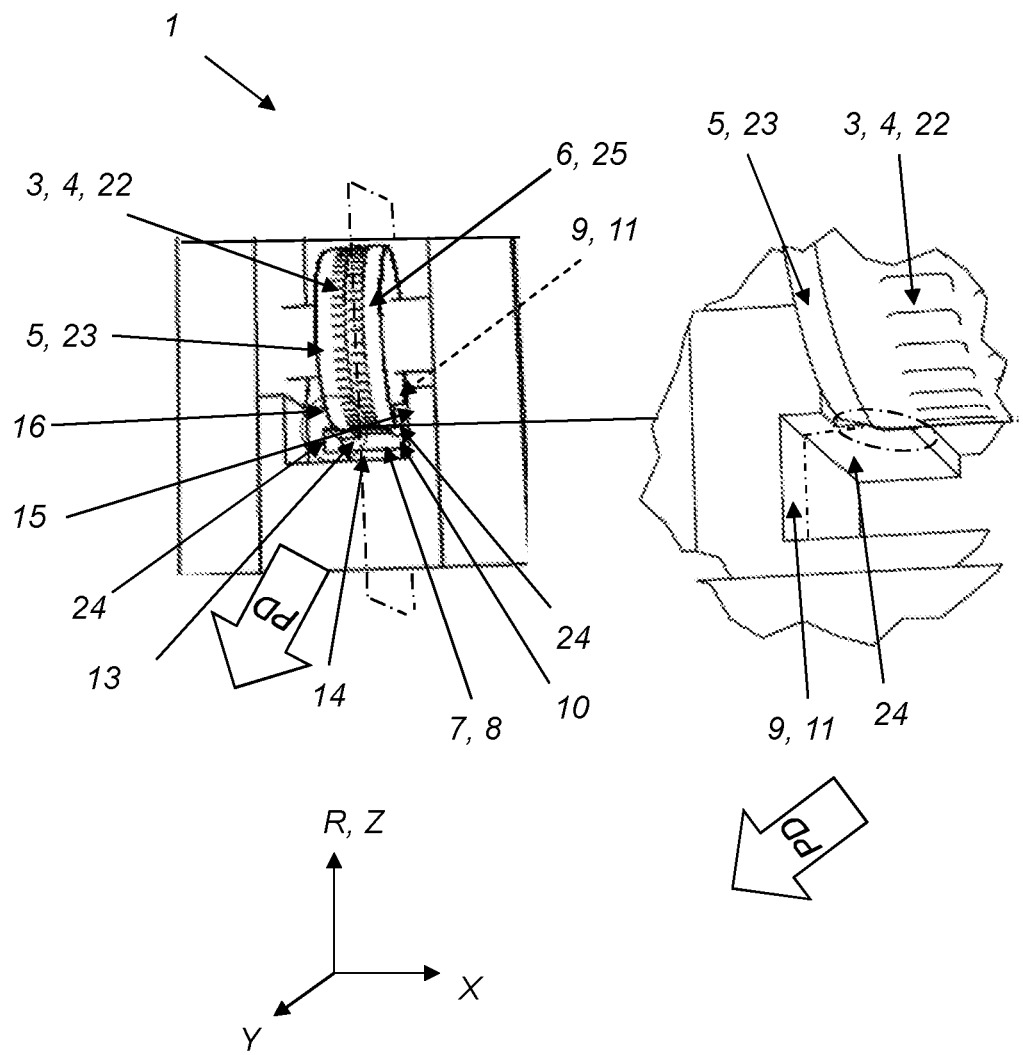
*Fig. 7*  *Fig. 8*

EXTRUSION AND/OR PULTRUSION DEVICE AND METHOD

CROSS-REFERENCE TO RELATED APPLICATION

This application is a 35 U.S.C. § 371 national stage application of PCT Application No. PCT/SE2020/050451 filed on May 5, 2020, entitled "AN EXTRUSION AND/OR PULTRUSION DEVICE AND METHOD," which claims priority to Swedish Patent Application No. 1950537-9 filed on May 6, 2019, each of which are incorporated herein in their entirety by reference.

TECHNICAL FIELD

The invention relates to an extrusion and/or pultrusion device for forming a profile product in a production direction, said device comprising:
  a rotating die, extending in a radial direction and a width direction, having two opposite first and second side walls and an outer circumferential surface extending in the width direction there between, wherein the rotating die comprises a first side portion in connection to the first side wall and a second side portion in connection to the second side wall and a mid-portion extending between the first and second side portions,
  and
  a profile definition zone having a longitudinal direction coinciding with the production direction, a height direction and a width direction being perpendicular to the height direction, comprising a through channel comprising a first channel section followed by a second channel section downstream the first channel section with reference to the production direction, wherein the rotating die is rotatable about an axis extending across the production direction and arranged to allow the outer circumferential surface to, while the rotating die rotates, exert a pressure onto a surface of the material when fed through the profile definition zone
  the first channel section is circumferentially delimited by
    one or more walls
    and wherein
  the second channel section is circumferentially delimited by
  the circumferential surface of the rotating die and
  a channel portion comprising
  a counter-bearing opposite the rotating die and
  opposing first and second channel portion side walls between the rotating die and the counter-bearing The invention also relates to a method for producing a profile product by use of such a device.

BACKGROUND ART

In the field of extrusion and/or pultrusion devices it is known using a rotating die immediately downstream a more traditional extrusion and/or pultrusion device using fixed or static walls. This type of extrusion with a rotating die is hereinafter referred to as 3D-extrusion and relates to that the rotating die operates in a pressurized zone in connection to the more traditional extrusion and/or pultrusion portion of the device, which differs 3D-extrusion from calendaring. The combination of the static walls in the first channel section and a rotating die in the second channel section gives the benefit of producing a profile product at a very high speed with maintained high quality of shape and imprint. It is thus an effective and relatively cheap production method that can be used for most materials that can be formed by use of extrusion, i.e. everything from e.g. plastic to aluminium.

SUMMARY OF THE INVENTION

With reference to background art, there is however a need for an improved leakage protection at a portion of the device where the first and second side walls of the rotating die meets the opposing first and second channel portion side walls in the second channel section.

The invention relates to an extrusion and/or pultrusion device for forming a profile product in a production direction, said device comprising:
  a rotating die, extending in a radial direction and a width direction, having two opposite first and second side walls and an outer circumferential surface extending in the width direction there between, wherein the rotating die comprises a first side portion in connection to the first side wall and a second side portion in connection to the second side wall and a mid-portion extending between the first and second side portions,
  and
  a profile definition zone having a longitudinal direction coinciding with the production direction, a height direction and a width direction being perpendicular to the height direction, comprising a through channel comprising a first channel section followed by a second channel section downstream the first channel section with reference to the production direction, wherein the rotating die is rotatable about an axis extending across the production direction and arranged to allow the outer circumferential surface to, while the rotating die rotates, exert a pressure onto a surface of the material when fed through the profile definition zone,
  wherein;
  the first channel section is circumferentially delimited by one or more walls
  and wherein
  the second channel section is circumferentially delimited by
  the circumferential surface of the rotating die and
  a channel portion comprising
  a counter-bearing opposite the rotating die and
  opposing first and second channel portion side walls between the rotating die and the counter-bearing,
  wherein the width of the first channel section is, at least along a portion of its length and at least along a portion of its height, less than a distance between the two opposite side walls of the rotating die. Hence, the first channel section should be at least smaller in width than a distance between the opposing first and second channel portion side walls in the second channel section. The difference in width between the first channel section and the second channel section depends on features of the first and second side portions and tolerances between the rotating die and the respective opposing first and second channel portion side walls. The width of the first channel section should be less than a distance being the distance between the opposing first and second channel portion side walls minus the sum of tolerances, i.e. the sum of the gap between the rotating die side walls and the respective opposing first and second channel portion side walls in the second channel section. If the first and second side portion comprises flange portions, see below for further explanation, then the width of the first channel section is, at least along a portion of its length and at least along a portion of its height, less than a distance between the two flange portions.

One advantage here is that local pressure reduction is achieved in connection to the first and second outer edge portions due to the geometrical difference in the first and second channel sections.

In order to more easily explain the device, a cylindrical coordinate system has been used for the rotating die and an orthogonal Cartesian coordinate system for a three-dimensional space for the device in general. The rotating die therefore is described as having a width direction from end to end coinciding with a centre line, i.e. rotation axis, about which the rotating die rotates, and a thickness in a radial direction being orthogonal to the width direction. The outer circumferential surface further extends about the axis in a rotation direction being perpendicular to the width direction. Here, rotation symmetric refers to a symmetrical disposition about the rotating axis or a rotational balanced disposition of the matter in the rotating die. The device in general, i.e. e.g. the profile definition zone, the first and second channel sections, is described as having a width direction, a height direction and a longitudinal direction, where the longitudinal direction coincides with the general production direction.

The rotating die is arranged to be rotatable about the axis and the axis can be directly or indirectly stored in and rotatably coupled to the first and second channel portion side walls.

With reference to the above described coordinate systems it should be noted that the axis of the rotating die can be arranged perpendicular to the longitudinal direction, i.e. to the production direction of the device in general, or can be arranged at an angle.

According to one example, the axis of the rotating die is directed substantially perpendicular to the production direction with the outer circumferential surface extending across the production direction in a width direction thereof.

According to one example, the axis of the rotating die coincide with the width direction of the device in general and the width direction of the rotating die coincide with the width direction of the device in general. The longitudinal direction coincide with the production direction, i.e. the main direction along which the material travels during production.

According to one example, the axis of the rotating die does not coincide with the width direction of the device in general, but the axis of the rotating die and the width direction of the rotating die is arranged at an angle being less or more than 90° to the longitudinal direction. However, the axis of the rotating die is arranged such that the outer circumferential surface extends across the production direction in a width direction thereof.

With reference to either one of the two examples above, the normal to the axis of the rotating die coincides with the height direction of the device in general. Here, the normal coincides with the radial direction of the rotating die. Here, the axis of the rotating die is directed perpendicular to the normal of the production direction regardless of whether the axis of the rotating die coincide or not with the width direction of the device in general. However, according to one example the normal to the axis of the rotating die can be arranged at an angle to the height direction of the device in general. However, the axis of the rotating die is arranged such that the outer circumferential surface extends across the production direction in a width direction thereof, but at an angle to the production direction.

According to one example, the one or more walls define a first cross-section at the end of the first channel section and wherein the second channel section defines a second cross-section at a position where the distance between the circumferential surface and the counter-bearing is at a minimum. As stated above, the geometry of the first channel section is different from the second channel section such that the material passing through the first channel section changes form when entering the second channel section. The changing of form is essential for increasing or maintaining the pressure level to such an extent that it will overcome the internal resistance (shear stresses) of the material, fast enough, for the material to saturate the second cross section, including an imprint of the rotating die.

According to one example, the minimum distance in the height direction between the circumferential surface and the counter-bearing in the second cross-section is less than a maximum distance in the height direction in the first cross-section. This has the advantage that the material entering the second channel section will be compressed in the second channel section such that the pressure is increased or maintained to such level that the material will transform fast enough to saturate the second channel section, including the imprint of the rotating die.

Hence, the pressure is increased or maintained to such level that the material will transform fast enough to saturate the second channel section, including an imprint of the rotating die. The pressure is achieved by a combination of an imprint depth of a pattern in the circumferential surface and a Poisson effect and/or a combination of the shape transition due to the geometrical shape difference between the first and second cross-sections and the Poisson effect.

The local pressure reduction is achieved in connection to the first and/or second side portions due to the geometrical difference in the first and second channel sections and a wake effect downstream the first channel section in connection to the first and/or second side portions.

According to one example, the first channel section comprises a third side portion extending in the width direction, wherein the third side portion is arranged in relation to the first side portion such that a pressure in the material to be extruded is less in connection to the first side portion than in connection to the third side portion, and/or wherein the first channel section comprises a fourth side portion extending in the width direction, wherein the fourth side portion is arranged in relation to the second side portion such that a pressure in the material to be extruded is less in connection to the second side portion than in connection to the fourth side portion. One advantage is that third and fourth side portions creates a wake effect and thus a local pressure decrease downstream the third and fourth side portions that further decreases the local pressure in the first and second side portions of the rotating die.

According one example, the first channel section comprises leeward means in connection to the third and/or fourth side portions arranged to decrease the space of the first channel section in the height direction being perpendicular to the width direction.

According one example the first channel section comprises leeward means in connection to the third and/or fourth side portions arranged to decrease the space of the first channel section in the width direction. A combination of leeward means are also possible.

According to one example, the leeward means is an elevation facing into the through channel. The elevation can be arranged from top to bottom in the first channel section, or can be arranged as a part or several parts along the distance between the top to bottom of the first channel section. The leeward means are advantageously positioned in connection to the first and second side portions of the rotating die.

One advantage with the leeward means is that the third and fourth side portions further decreases the local pressure in connection to recesses and/or flange portions in the first and second side portions of the rotating die, see below.

According to one example, the second channel section is arranged in relation to the first channel section with a predetermined second distance between the radially outermost portion of the circumferential surface of the rotating die and the counter-bearing in the channel portion being less than a predetermined first distance between the most far apart portions of the first channel section taken in a height direction coinciding with the radial direction, and/or wherein:

the second channel section is arranged in relation to the first channel section with a predetermined fourth distance between the innermost narrowest portions of the channel portion in the width direction being greater than a predetermined third distance between side walls in the first channel section taken in the width direction at the exit area from the first channel section.

One advantage is that the narrower first channel section creates a wake effect with decreased pressure downstream in the first channel section and in connection to the first and second side portions of the rotating die due to that the second channels section is broader.

Further strategies for local pressure reduction are possible in combination with further leakage preventing strategies.

According to one example embodiment, the first side portion comprises a first flange portion extending in the width direction and the radial direction with an extension in the radial direction exceeding the radial extension of at least a part of the mid-portion and wherein the second side portion comprises a second flange portion extending in the width direction and the radial direction with an extension in the radial direction exceeding the radial extension of at least a part of the mid-portion.

One advantage is that the flange portions physically hinder the material from flowing all the way to the first and second side walls of the rotating die and thus the first and second channel portion side walls.

According to one example, the first flange portion comprises a first outer circumferential surface delimiting the first flange portion in the rotational direction and wherein the second flange portion comprises a second outer circumferential surface delimiting the second flange portion in the rotational direction.

It should be noted that the first and/or the second side portions could comprise the first flange portion and/or the second flange portion in different ways.

According to one example, the first and/or second side portions comprise only the flange portions in the first and second side portions. Here, there is a transition from the mid-portion to the respective flange portions coinciding with the transition from the mid-portion to each of the first and second side portions.

According to another example, the first and second side portions comprise the first and second flange portions respectively and each of the first and second side portions comprises a first additional portion extending in the width direction of the rotating die.

According to one example, the first additional portion is arranged directly adjacent the mid-portion and there is a transition from the mid-portion to the first additional side portion coinciding with the transition from the mid-portion to each of the first and second side portions. The first additional portion in the first side portion thus extends between the first flange portion to the mid-portion and the first additional portion in the second side portion thus extends between the second flange portion to the mid-portion. The first additional portion could for example comprise a recess according to examples described below or a portion having the same radial extension as the mid-portion but with different features.

According to one example, the first and/or second flange portions are arranged directly adjacent the mid-portion and there is a transition from the mid-portion to the first and/or second flange portions coinciding with the transition from the mid-portion to each of the first and second side portions. Here, the first additional side portion in the first side portion is arranged between the first side wall and the first flange portion and the first additional side portion in the second side portion is arranged between the second side wall and the second flange portion.

According to one example, the first and/or second side portions comprise the first and second flange portions arranged at a distance from the mid-portion with a second additional portion extending in the width direction of the rotating die between the mid portion and the first additional side portion and there is a transition from the mid-portion to each of the flange portions not-coinciding with the transition from the mid-portion to each of the first and second side portions. The second additional portion is in some aspects different from similar aspects of the mid-portion, for example the second additional portion could be textured or non-textured or be of a different material than the mid-portion.

According to one example, the first and/or the second side portions comprise a combination of the above and below described first and second flange portions, annual recesses and first and second additional portions.

According to one example, the first and second outer circumferential surfaces follow the contour of the mid-portion, i.e. has the same geometrical shape or form but with different radial extension. One advantage is a uniform general shape of the profile product.

According to one example, the first and/or second outer circumferential surfaces are arranged in an undulating manner, i.e. the first and/or second flange portions are arranged with a cogwheel like shape. According to one example, the first and/or second outer circumferential surfaces are arranged with a smooth annular shape, i.e. the first and/or second flange portions are arranged with a circular or oval shape.

According to one example, the first and second flange portions are rotation symmetric about an axis of the rotating die. One advantage is less oscillation problems when the rotating die rotates at a high speed.

It is further possible with use of additional leakage reducing or eliminating strategies in combination with the above described flange portions and/or in combination with the above described local pressure reduction in connection to the first and second outer edge portions.

According to one example, the first and/or second side portions comprises one or more recesses extending the width direction and in the radial direction with an extension in the radial direction being less than a radial extension of at least a part of the mid-portion.

One advantage with the device is that the recess or recesses create a space with decreased pressure in the first and/or second side portions compared to other parts of the rotating die positioned axially, i.e. in the width direction, closer to a centre of the rotating die compared to the recess or recesses. The decreased pressure reduces and/or removes the problem with leakage where the first and second side walls of the rotating die meets the opposing first and second channel portion side walls in the second channel section since the material that is processed can flow towards the first and second side walls but the decrease in pressure on the material inherently slows down the flow. Dependent on design, the material flow can be stopped before reaching the first and second side walls of the rotating die or may be allowed to flow at a controlled rate to hit the first and second channel portion side walls but with a predetermined and adequate tolerance between the first and second side walls of the rotating die and the first and second channel portion side walls that hinders leakage. The tolerance depends also on what material that is worked, a more fluid material demands a small tolerance, i.e. a small distance between the rotating die and the first and second channel portion side walls, and a less fluid material can allow for a greater tolerance, i.e. a larger distance. The flow of material is also dependent on the shape and form of the rotating die and the position of the rotation die with relation to the shape and form of the first channel section. For example, a rotating die that is radially thicker in the middle than on the sides will create a larger pressure centrally and thus a greater flow towards the first and second side walls of the rotating die compared to a rotating die that is radially smaller in the middle than on the sides.

The first and second side walls are positioned in relation to the first and second channel portion side walls such that the first and second side walls are rotatably connected to the first and second channel portion side walls with the advantageous possibility of a greater tolerance due to the leakage strategy where the width of the first channel section is, at least along a portion of its length and at least along a portion of its height, less than a distance between the two opposite side walls of the rotating die and/or the use of one or more recesses and/or the use of one or more flange portions.

Hence, the size of the recesses depends on a number of parameters and need to be designed dependent on, for example, the material to be processed, the shape and form of the rotating die and the relationship between the shape and form of the first channel section and the second channel section.

The size of the recess, i.e. the extension in the width direction, the rotation direction, i.e. the circumferential direction being perpendicular to the width direction and depth of the recess, gives the size of the space into which the material can flow and therefore gives the possibility to determine how much the pressure should be reduced in the recess, compared to at least a portion of the mid-portion. The rule is that the greater the space the more the pressure decreases, but also the shape of the recess has an impact on gradient of the pressure difference. For example, a step, i.e. 90° drop, gives a more immediate pressure drop than a slanted surface.

It should be noted that one of or both the first and second side portions comprises a recess. According to one example, the recess is an annular recess, i.e. extending circumferentially about the rotational axis. According to one example, the first and/or second side portions comprises one or more recesses not being annular but arranged as one ore many single recesses. Each single recess has an extension in the width direction, the rotation direction, i.e. the circumferential direction being perpendicular to the width direction, and the radial direction. The single recesses can have similar or different shape and are advantageously. The single recesses can be arranged in different patterns extending circumferentially about the rotational axis. The single recesses can be arranged in one single line of recesses extending circumferentially about the rotational axis or can be arranged as two or more lines of recesses arranged next to each other in the width direction. The two or more lines of recesses can be arranged such that one or more recesses are arranged next to each other in the width direction or offset to each other in the circumferential direction. The different lines of single recesses can have same or different number of recesses.

It should be noted that the first and/or the second side portions could comprise the recess in different ways.

According to one example, the first and/or second side portions comprise only the recess or recesses in the first and second side portions. Here, there is a transition from the mid-portion to the recess coinciding with the transition from the mid-portion to each of the first and second side portions.

According to another example, the first and second side portions comprises the recess or recesses and a first additional portion extending in the width direction of the rotating die. According to one example, the recess is arranged directly adjacent the mid-portion and there is a transition from the mid-portion to the recess coinciding with the transition from the mid-portion to each of the first and second side portions. The first additional portion thus extends between the recess and the first and/or second side wall respectively of the rotating die. The first additional portion could for example comprise a flange according to one example described above or a portion having the same radial extension as the mid-portion.

According to one example, the recess or recesses are arranged at a distance from the mid-portion with a second additional portion extending in the width direction of the rotating die between the mid portion and the recess and there is a transition from the mid-portion to the recess not-coinciding with the transition from the mid-portion to each of the first and second side portions, but a transition between the second additional portion and the recess. The second additional portion is in some aspects different from similar aspects of the mid-portion, for example the second additional portion could be textured or non-textured or be of a different material than the mid-portion.

According to one example, the first and/or the second side portions comprise a combination of the above described recess and first and second additional portions.

According to one example, the recess or recesses follow the contour of the mid-portion, i.e. has the same geometrical shape or form but with different radial extension. One advantage is a uniform general shape of the profile product.

According to one example, the recesses or recesses are rotation symmetric about an axis of the rotating die. One advantage is less oscillation problems when the rotating die rotates at a high speed.

Hence, the recess is either an indentation in the rotating die or a portion of the rotating die having a lesser radial extension compared to other parts of the rotating die.

In one example embodiment, the recess is positioned in close connection to the flange portions and decreases pressure locally to further reduce the flow of material towards the first and second channel portion side walls.

According to one example, the circumferential surface comprises a textured portion. The entire circumferential surface can be textured, but as an alternative only a portion can be textured.

According to one example, the first side portion comprises a non-textured portion extending between the first side wall and the textured portion and wherein the second side portion comprises a non-textured portion between the second side wall and the textured portion.

According to one example in connection to the example embodiment with flange portions described above, the first side portion comprises a non-textured portion extending between the first flange portion and the textured portion and wherein the second side portion comprises a non-textured portion between the second flange portion and the textured portion.

According to one example in connection to the example embodiment with recesses described above, the recess is a non-textured portion and/or the first side portion comprises a non-textured portion extending between the recess(es) and the textured portion.

The non-textured portions advantageously have a radius less than a radius to an imprint depth of the textured portion.

According to one example, the circumferential surface is non-textured or has a micro pattern that leaves only an infinitesimal imprint on the profile product that can be visible or non-visible for the human eye.

According to one example, the channel portion comprises a second rotating die arranged opposite the first rotating die described above. The second rotating die can either replace the counter-bearing in its entirety or can be a part of a static counter-bearing. The second rotating die can be arranged in a similar way as the above described first rotating die to create same or different patterns on two sides of the profile product. The second rotating die can comprise recesses and/or flange portions that can be arranged to cooperate with recesses and/or flange portions of the first rotating die.

According to one example, the channel portion comprises a third rotating die arranged at an angle to the first rotating die. This rotating die replaces the opposing first or second channel portion side wall entirely or partly. The third rotating die can be arranged together with only the first rotating die or together with both the first and second rotating die.

According to one example, the channel portion comprises a fourth rotating die arranged opposite the third rotating die. The third rotating die can be arranged together with only the first rotating die or together with both the first and second rotating die The third and/or the fourth rotating die(s) can be arranged in a similar way as the above described first rotating die to create same or different patterns on two sides of the profile product. The second rotating die can comprise recesses and/or flange portions that can be arranged to cooperate with recesses and/or flange portions of the first rotating die.

According to one example, two or more rotating dies are synchronised. This has the advantage of feeding the material at the same speed. However, it could be possible to also use non-synchronous rotating dies in order to create friction and/or a special pattern and/or to compensate for material differences.

In all the above examples it is possible to use a combination of textured and non-textured rotating dies.

The invention also refers to a method for producing a profile product by use of a device according to any one of the preceding claims, wherein the method comprises
 feeding a material to the first channel section and forming the same in the first channel section,
 feeding the material further to the second channel section and forming the same in the second channel section.

The material that is fed into the device to form the profile product can be in the form of one homogenous material or a mixture of two or more materials. The materials can be blended in different ratios and may be blended into a homogeneous mix or a mix with gradients within the material. One material can be a solid and another material can be mouldable, e.g. stone bits and rubber. The material can also be a layered material comprising two or more layers of same or different materials. The material may comprise one or more strings of solid material that follow through the entire extrusion or pultrusion process, e.g. a wire or another reinforcement material.

At least a part of the material should be plastically deformable when subject to the pressure applied in the first and/or second channel sections. Such materials are often denoted viscoelastic and/or viscoplastic materials.

Furthermore, here extrusion relates to a process where a material is fed by pressure into the first channel section to be formed in the first and second channel sections. Pultrusion relates to where the material to be formed is fed to the device and drawn through the first and second channel sections. It should be noted that the device can be arranged purely for extrusion or purely for pultrusion or a combination of the two.

The device can be arranged for co extrusion with one or more inlet channels that connects to the first channel section. Hence, one or more materials could be fed to the first channel section via one channel, but two or more materials can be fed to the first channel section via one inlet channel or a multiple channel inlets. The multiple inlet channels can be the same in number as the number of materials or the multiple inlet channels can be less than the number of materials if two or more materials are fed via one inlet channel.

Furthermore, profile product refers to a product having a three dimensional form, i.e. length, width and height. The profile product may have a cross-section taken in the width and height plane being similar all along the length or may be different dependent on position in length. The cross-section can have any suitable two dimensional shape, for example, round, oval, elliptical, i.e. two sides, undulating, three or more sides or a combination of the same. One or more sides may be patterned, i.e. textured with one or more patterns. The pattern/texture is created by the rotating die.

It should be noted that the invention can be varied within the scope of the claims and that the examples described above and below should not be seen as limiting for the invention.

For example, the first channel section could be circumferentially delimited by static walls or could be arranged with one or more dynamic walls as long as the material can be extruded or pultruded with the device according to the invention. Static walls has the advantage of being cheap and robust.

According to one example, the first channel portions can be arranged centred with relation to the second channels. This has the advantage that the flow of material entering the second channel is evenly distributed. The first and second side portions can be arranged centred with respect to the first channel section with the advantage of having a evenly distributed decrease in pressure over the rotating die.

For example, the device could comprise several rotating devices arranged side by side, i.e. the rotating device could comprise two or more rotating devices having a common rotating axel. The different rotating devices could be arranged in separate second channels or could be arranged in a common separate channel. The different rotating devices could have the same or different texture to create same or different patterns on the profile product. The profiled product could thus comprise one or more strands of internal profiles running along the production direction and being generated by the different rotating devices. The different strands could be separable into separate products at predetermined separation lines that could coincide with the separation of the different rotating devices. However, one separate rotating die could comprise a pattern/texture that separates similar or different patterns such that the profiled product comprises one or more strands of internal profiles running along the production direction. Also here, the strands could be separable in the profiled product.

According to one example, one side portion, i.e. the first side portion or the second side portion, comprises a flange but no recess, and the other side portion, i.e. the first side portion or the second side portion, comprises a recess but no flange.

The rotating die can be mounted onto an axis or can be arranged with an axis incorporated in the rotating die body.

BRIEF DESCRIPTION OF THE DRAWINGS

The invention will below be described in connection to a number of drawings, wherein;

FIG. 3a schematically shows a front view and inlet of one example of a rotary die;

FIG. 3b schematically shows a perspective view of the rotary die in FIG. 3a;

FIG. 3c schematically shows a front view and inlet of one example of a rotary die;

FIG. 3d schematically shows a perspective view of the rotary die in FIG. 3c;

FIG. 4a schematically shows a back view and outlet of one example of a device according to the invention;

FIG. 4b schematically shows a perspective view of the device in FIG. 4a;

FIG. 7 schematically shows a perspective back view and outlet of a device according to the invention;

FIG. 8 schematically shows an enlarged view of a part of the device in FIG. 7;

FIG. 19 schematically shows a back view and outlet of an assembly of rotary dies including four rotary dies;

FIG. 20 schematically shows a perspective view of an assembly according to FIG. 19, and wherein;

DETAILED DESCRIPTION

The invention will below be described in connection to a number of drawings. Same features will be denoted with like numbers in all the drawings.

Here, front view with inlet and back view with outlet are used as an orientation for the reader with regard to production direction where material to be worked is inserted into the inlet and a profile product is shaped in the device and then exits the device via the outlet.

In some drawings, the production direction is denoted PD with an arrow pointing in the production direction.

Figure 1:
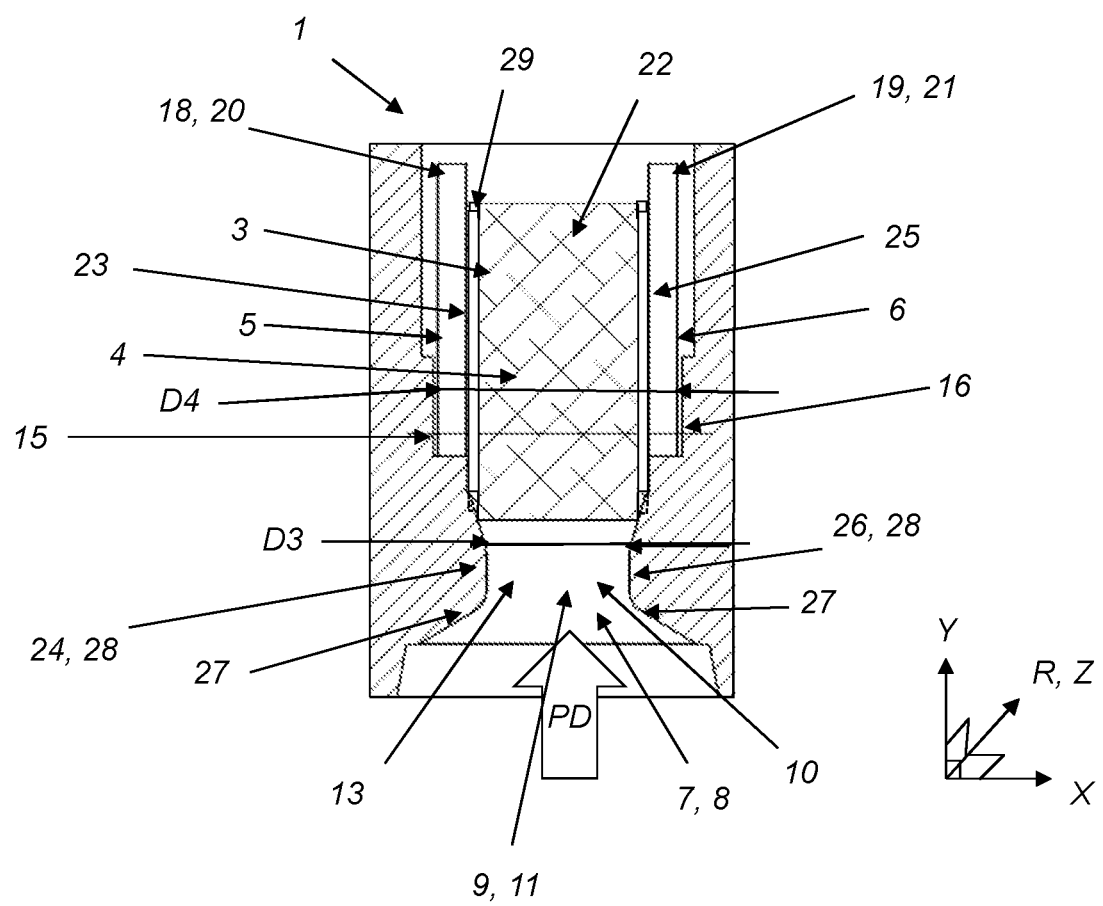
FIG. 1 schematically shows a cross-sectional view from below along section A-A in FIG. 2 of a device according to one example of the invention.
Figure 2:
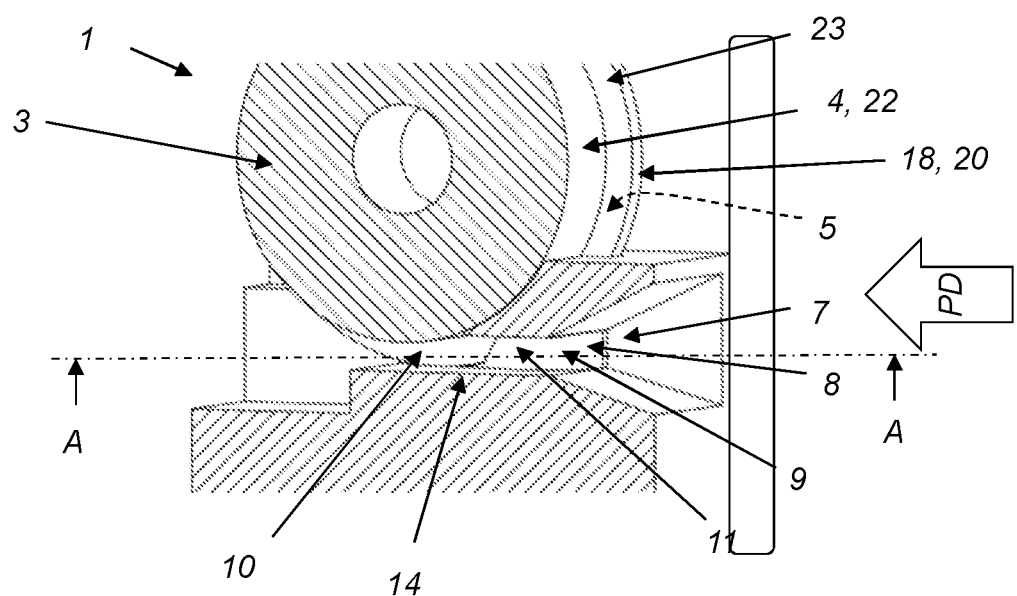
FIG. 2 schematically shows a cross-sectional perspective side view of a device according to the invention.

FIG. 1 schematically shows a view from below along section A-A in FIG. 2, i.e. in a height direction Z, of a device according to one example of the invention and FIG. 2 schematically shows a cross-section perspective view of the device in FIG. 1. FIGS. 1 and 2 show an extrusion- or pultrusion device 1 for extrusion- or pultrusion of a material for forming a profile product 2, see FIGS. 4a-4d, in a production direction Y, said device comprising:

a rotating die 3, extending in a radial R direction and a width direction X, having two opposite first and second side walls 5, 6 and an outer circumferential surface 4 extending in the width direction X there between, wherein the rotating die 3 comprises a first side portion 23 in connection to the first side wall 5 and a second side portion 25 in connection to the second side wall 6 and a mid-portion 22 extending between the first and second side portions 23, 25, and a profile definition zone 7 having a longitudinal direction Y coinciding with the production direction Y, a height direction Z and a width direction X being perpendicular to the height direction Z, comprising a through channel 8 comprising a first channel section 9 followed by a second channel section 10 downstream the first channel section 9 with reference to the production direction, wherein the rotating die 3 is rotatable about an axis extending across the production direction Y and arranged to allow the outer circumferential surface 4 to, while the rotating die 3 rotates, exert a pressure onto a surface of the material when fed through the profile definition zone 7, and wherein;

the first channel section 9 is circumferentially delimited by one or more walls 11
and wherein
the second channel section 10 is circumferentially delimited by
the circumferential surface 4 of the rotating die 3 and
a channel portion 13 comprising
a counter-bearing 14, shown in FIG. 2, opposite the rotating die 3 and opposing first and second channel portion side walls 15, 16 between the rotating die 3 and the counter-bearing 14.

In FIG. 1 the width D3 of the first channel section 9 is, at least along a portion of its length and at least along a portion of its height, less than a distance D4 between the two opposite side walls 5, 6 of the rotating die 3. Hence, the first channel section 9 should be at least smaller in width than a distance between the opposing first and second channel portion side walls 15, 16 in the second channel section 10. The difference in width between the first channel section 9 and the second channel section 10 depends on features of the first and second side portions 23, 25 and tolerance between the rotating die 3 and the respective opposing first and second channel portion side walls 15, 16. The width D3 of the first channel section 9 should be less than a distance D4 being the distance between the opposing first and second channel portion side walls 15, 16 minus the sum of tolerances, i.e. the sum of the gap between the rotating die side walls 5, 6 and the respective opposing first and second channel portion side walls 15, 16 in the second channel section 10. If the first and second side portion comprises flange portions 18, 19, see below for further explanation, then the width D3 of the first channel section 9 is, at least along a portion of its length and at least along a portion of its height, less than a distance D4 between the two flange portions 18, 19.

Figures 13, 14:
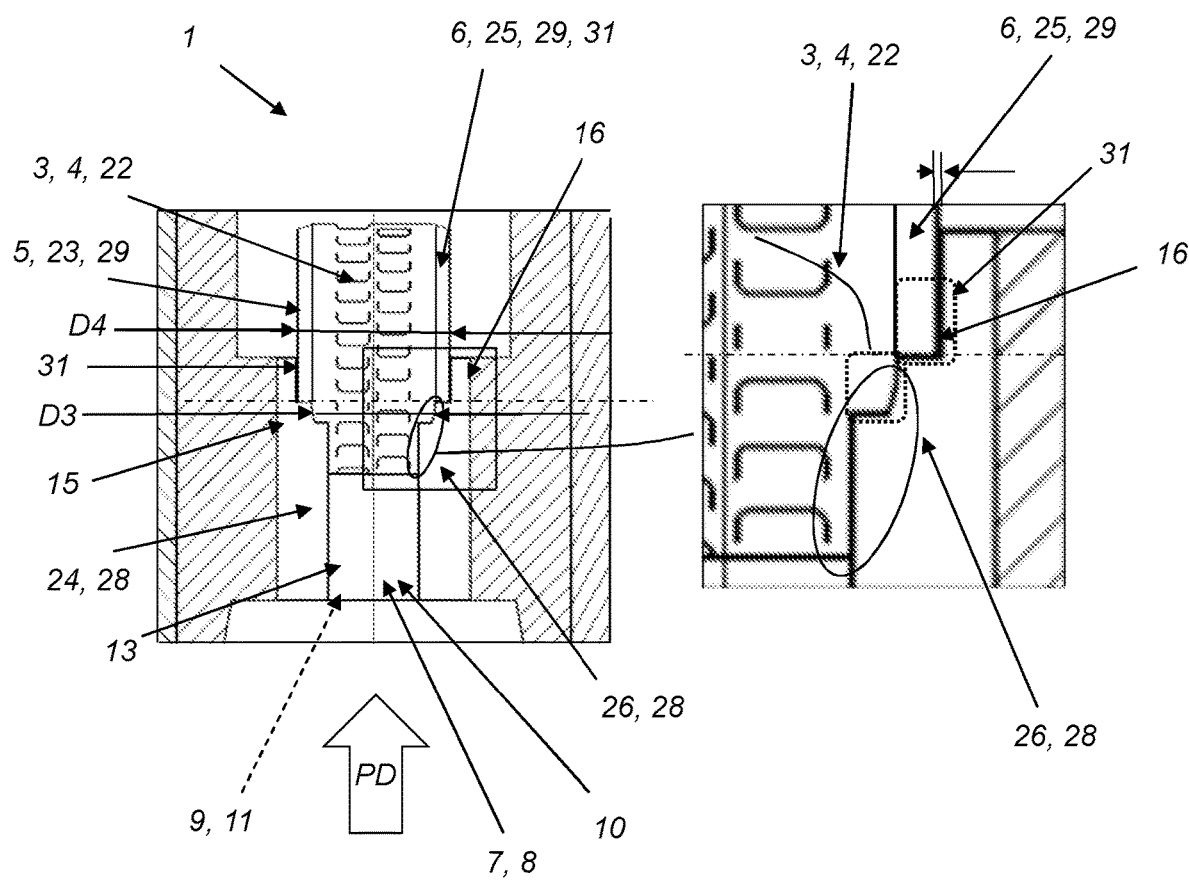
FIG. 13 schematically shows a view from below along section A-A in FIG. 2 of a device according to the invention.
FIG. 14 schematically shows an enlarged view of a part of the device in FIG. 13.
Figure 15:
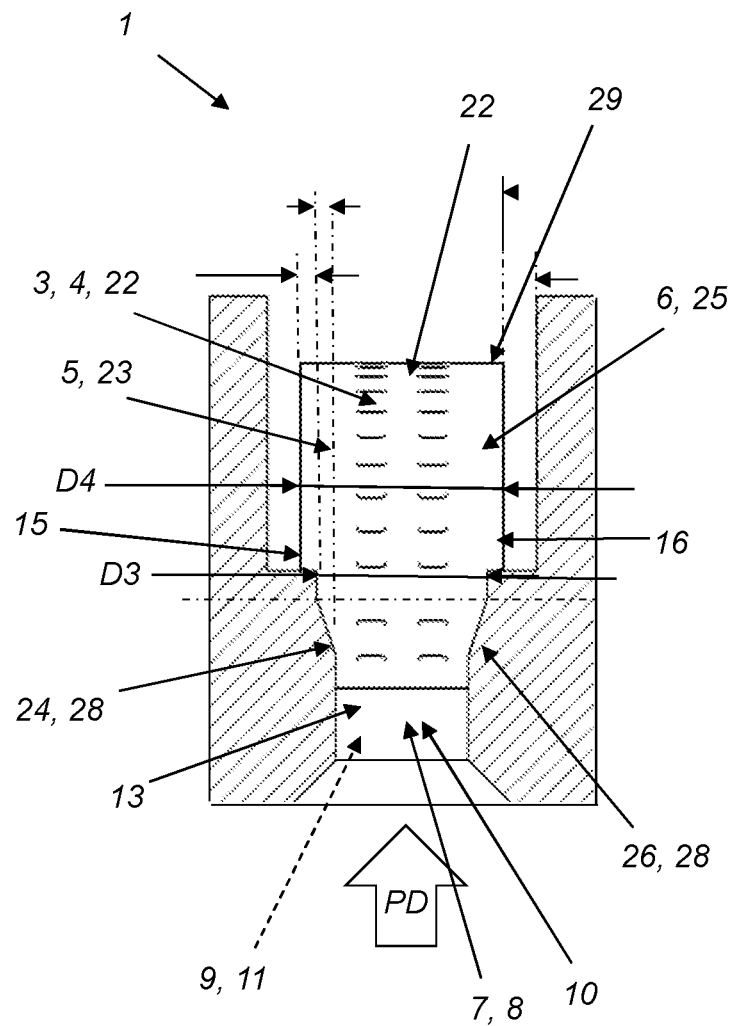
FIG. 15 schematically shows a view from below along section A-A in FIG. 2 of a device according to one example of the invention.

One advantage is that a local pressure reduction is achieved in connection to the first and second outer edge portions 5, 6 due to the geometrical difference in the first and second channel sections 9, 10. The local pressure reduction reduces the flow speed of the material and this removes leakage problems between the first side wall 5 and the first and the first channel portion side wall 15; and between the second side wall 6 and the second channel portion side wall 16. This will be explained further below and also in combination with additional leakage protection strategies. FIG. 1 shows one example of an additional leakage protection strategy and FIGS. 13 and 15 show other examples of leakage protection strategies. The different examples can be combined, as shown in FIG. 1, which is explained further above and below.

It should be noted that the rotating die 3 can be cylindrical or non-cylindrical textured or not textured dependent on desired profile of the profile product.

In FIG. 1 the first side portion 23 comprises a first flange portion 18 extending in a radial direction R with an extension exceeding the radial extension of at least a part of the mid-portion 22 and wherein the second side portion 25 comprises a second flange portion 19 extending in the radial direction with an extension exceeding the radial extension of at least a part of the mid-portion 22.

The first flange portion 18 and the second flange portion 19 are arranged to prevent movement of the material outside the rotating die 3 in a direction towards the opposing first and second channel portion side walls 15, 16.

The first flange portion 18 comprises a first outer circumferential surface 18 delimiting the first flange portion 18 in the rotational direction R and wherein the second flange portion 19 comprises a second outer circumferential surface 21 delimiting the second flange portion 19 in the rotational direction. The first and second outer circumferential surfaces 20, 21 are arranged at an angle being between 1-90 degrees compared to the first side wall 5 and second side wall 6 respectively, with a radial increase towards the first side wall 5 and second side wall 6 respectively.

FIG. 3a schematically shows a front view of one example of a rotary die, and FIG. 3b schematically shows a perspective view of the rotary die in FIG. 3a. FIGS. 3a and 3b show that the first flange portion 18 extends in a radial direction R with an extension exceeding the radial extension of the entire mid-portion 22 and wherein the second flange portion 19 extends in the radial direction with an extension exceeding the radial extension of the entire mid-portion 22. The mid-portion 22 may however have variations in the radial extension or may have no variations as shown in FIGS. 3a and 3b.

FIG. 3c schematically shows a front view of one example of a rotary die, and FIG. 3d schematically shows a perspective view of the rotary die in FIG. 3c. FIGS. 3c and 3d show that the first flange portion 18 extends in a radial direction R with an extension exceeding the radial extension of a part of the mid-portion 22, but that one part of the mid-portion has a radial extension exceeding the radial extension of the first flange portion 18. FIGS. 3c and 3d further show that the second flange portion 19 extends in a radial direction R with an extension exceeding the radial extension of a part of the mid-portion 22, but that one part of the mid-portion has a radial extension exceeding the radial extension of the second flange portion 18. The mid-portion 22 may however have further variations in the radial extension or may have no further variations as shown in FIGS. 3a and 3b.

The first and second outer circumferential surfaces 20, 21 are arranged at an angle being less than 90 degrees compared to the first side wall 5 and second side wall 6 respectively, with a radial increase towards the first side wall 5 and second side wall 6 respectively. FIGS. 3a-3d show that the first and second outer circumferential surfaces 20, 21 are arranged at an angle being 90 degrees compared to the first side wall 5 and the second side wall 6 respectively, with a radial increase towards the first side wall 5 and second side wall 6 respectively.

Figures 4A, 4B:
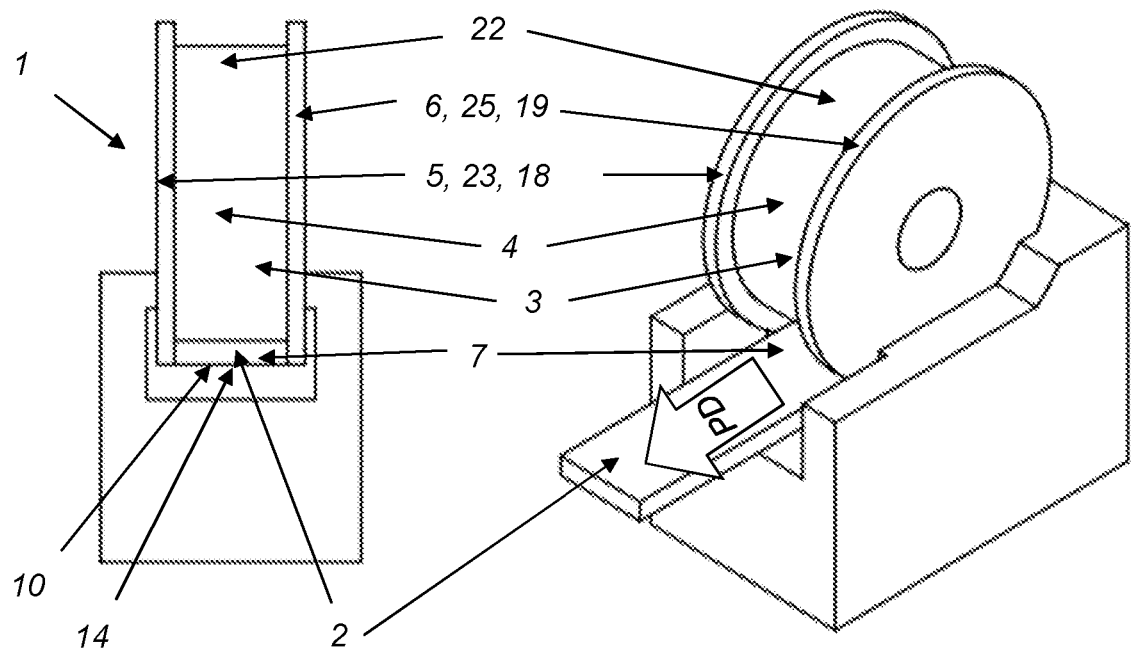

FIG. 4a schematically shows a back view and outlet of one example of a device according to the invention and FIG. 4b schematically shows a perspective view of the device in FIG. 4a. FIGS. 4a and 4b show that the first and second flange portions 18, 19 are arranged at a distance to the counter-bearing 14 being small enough to encompass the entire profile product 2 such that the width of the profile product is defined and equal to the width of the mid-portion, i.e. the distance between the first and second flange portions 18, 19.

Figures 4C, 4D:
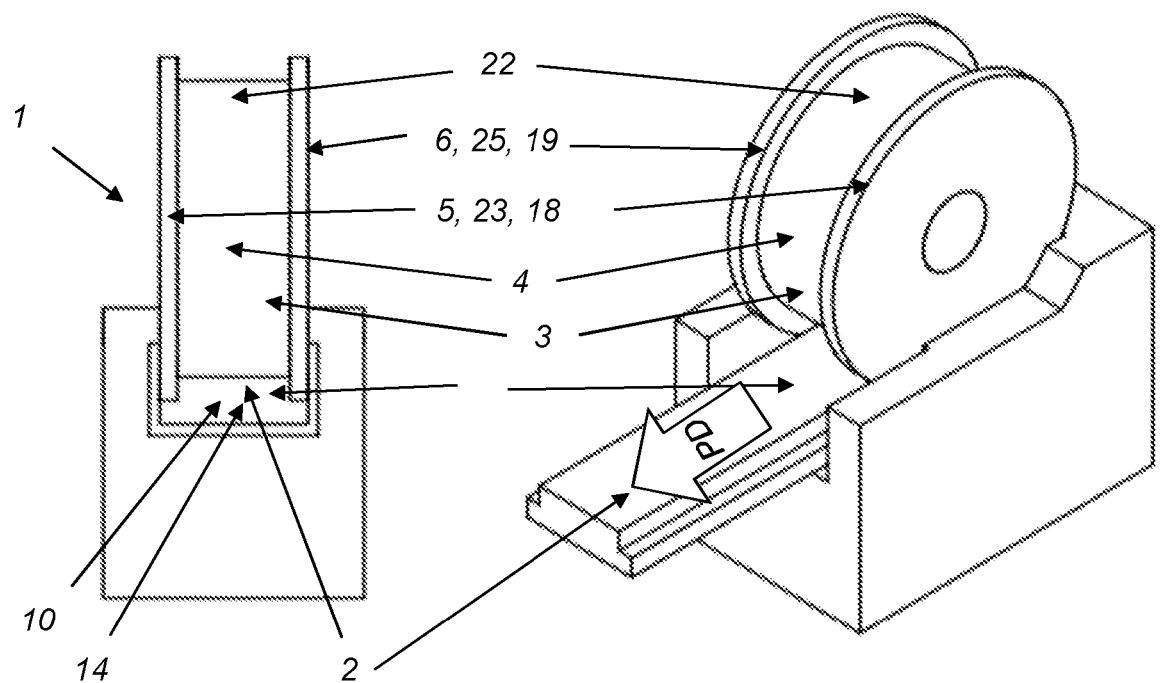
FIG. 4c schematically shows a back view and outlet of a device according to the invention.
FIG. 4d schematically shows a perspective view of the device in FIG. 4c.

FIG. 4c schematically shows a back view and outlet of one example of a device according to the invention and FIG. 4d schematically shows a perspective view of the device in FIG. 4c. FIGS. 4c and 4d show that the first and second flange portions 18, 19 are arranged at a distance to the counter-bearing 14 being big enough to allow material in the second channel portion 10 between the first and second flange portions 18, 19 and the counter bearing 14. Hence, the first and second flange portions 18, 19 encompass a part of the profile product 2 such that the width of a part of the profile product is defined and equal to the width of the mid-portion, i.e. the distance between the first and second flange portions 18, 19. This embodiment is suitable for certain high viscosity materials, i.e. slow flowing materials, but may also be allowed if the first and second flange portions 18, 19 are used in combination with further leakage protective strategies and means.

In FIGS. 1-4, the first and second outer circumferential surfaces 20, 21 follow the contour of the mid-portion 22 and that the first and second flange portions 18, 19 are rotation symmetric about an axis of the rotating die 3. Dependent on design and type of profile product to be produced the flange portions 18, 19, can have different shape and be arranged non-symmetric as long as the flange portions 18, 19 effectively hinders movement of the material.

FIGS. 1 and 5-20 show further leakage protective strategies and means arranged for local pressure reduction in the first and second side portions 23, 25 of the rotating die 3.

FIG. 1 shows that the rotating die 3 comprises annular recesses 29 arranged in connection to the first and second flange portions 18, 19. This has the advantage of further hindering movement of material due to pressure reduction, which will be discussed further in connection to FIGS. 5-20. It should be noted that in FIGS. 5-20 the first and second flange portions 18, 19 are not shown. It should also be noted that the flange portions 18, 19 are not prerequisites for the annular recess 29, but the annular recess 29 can be arranged in the rotating die 3 without the flange portions but in connection to the arrangement where the width of the first channel section 9 is, at least along a portion of its length and at least along a portion of its height, less than a distance between the two opposite side walls 5, 6 of the rotating die 3.

Figure 5:
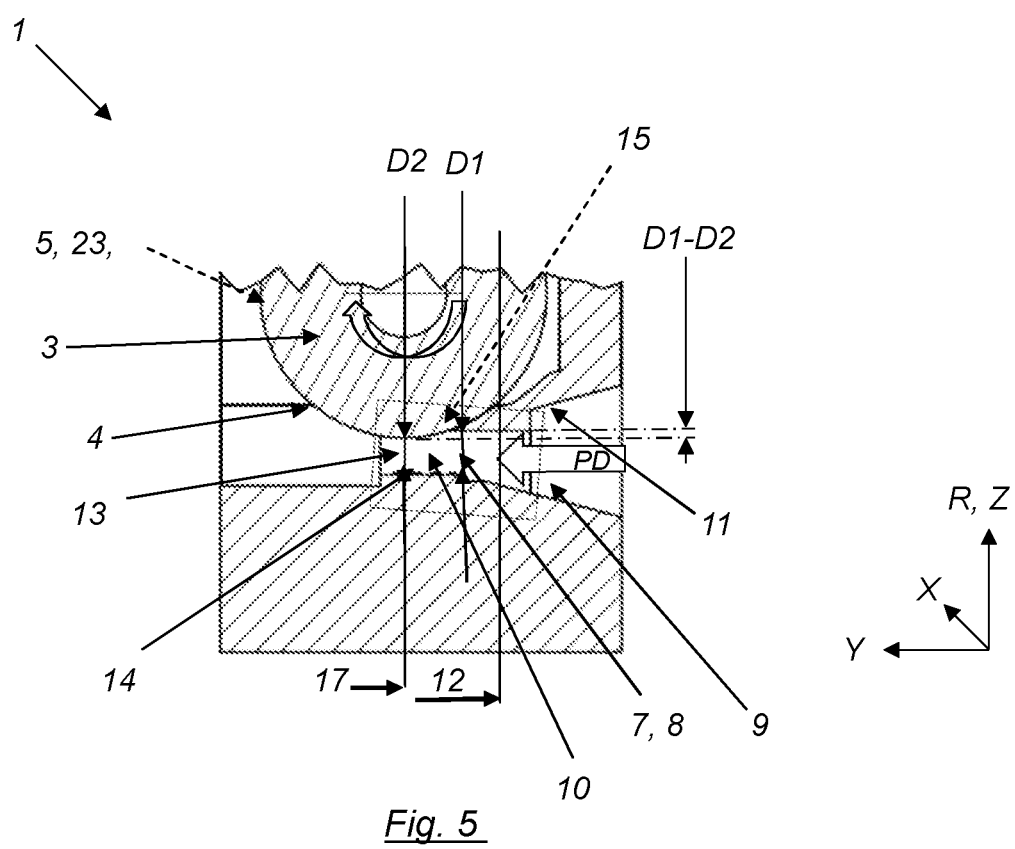
FIG. 5 schematically shows a cross-sectional side view of a device according to one example of the invention FIG. 6 schematically shows a perspective back view and outlet of a device according to one example of the invention.
Figure 6:
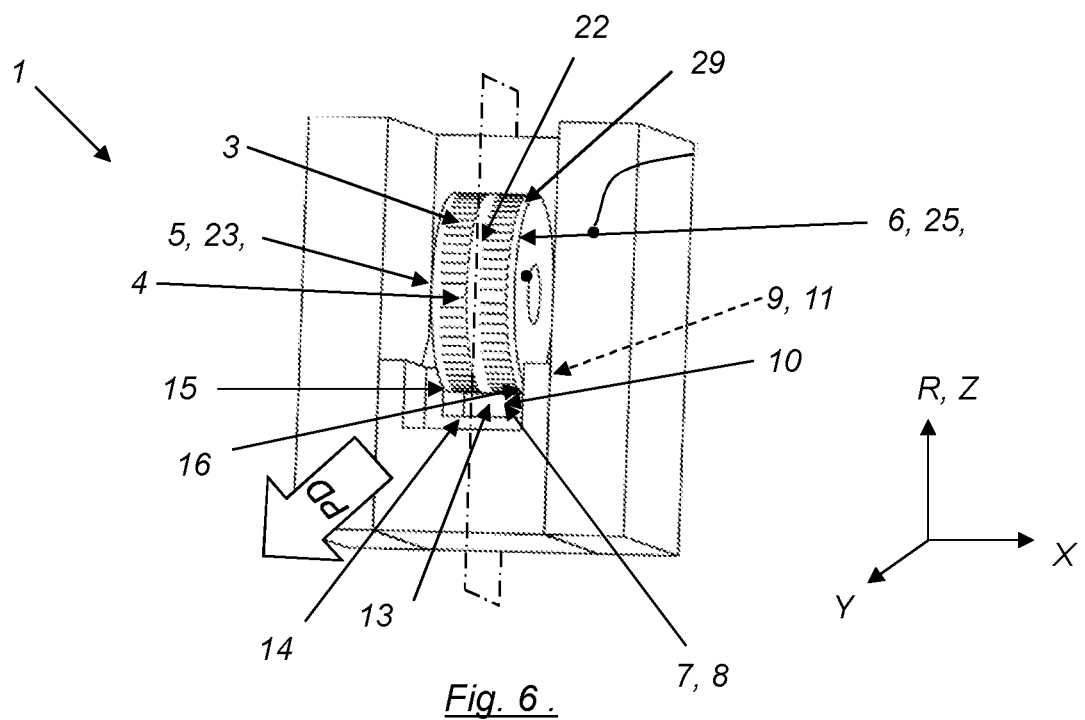

FIG. 5 schematically shows a cross-sectional side view of a device according to one example embodiment of the invention and FIG. 6 schematically shows a back view and outlet of the device in FIG. 5. FIGS. 5 and 6 show that the first and/or second side portions 23, 25 comprises an annular recess 29 extending in a radial direction R with an extension being less than a radial extension of at least a part of the mid-portion 22.

The annular recesses 29 has a depth dependent on the material, design of rotating die, geometric shape of the first and second channel section, and can vary between anything from one or more parts of a millimetre to a couple of centimetres, as long as the local pressure is decreased enough to ensure prevention of leakage due to that the flow speed in the material is lowered.

FIG. 7 schematically shows a back view and outlet of a device according to the invention and FIG. 8 schematically shows an enlarged view of a part of the device in FIG. 7.

Figures 9, 10:
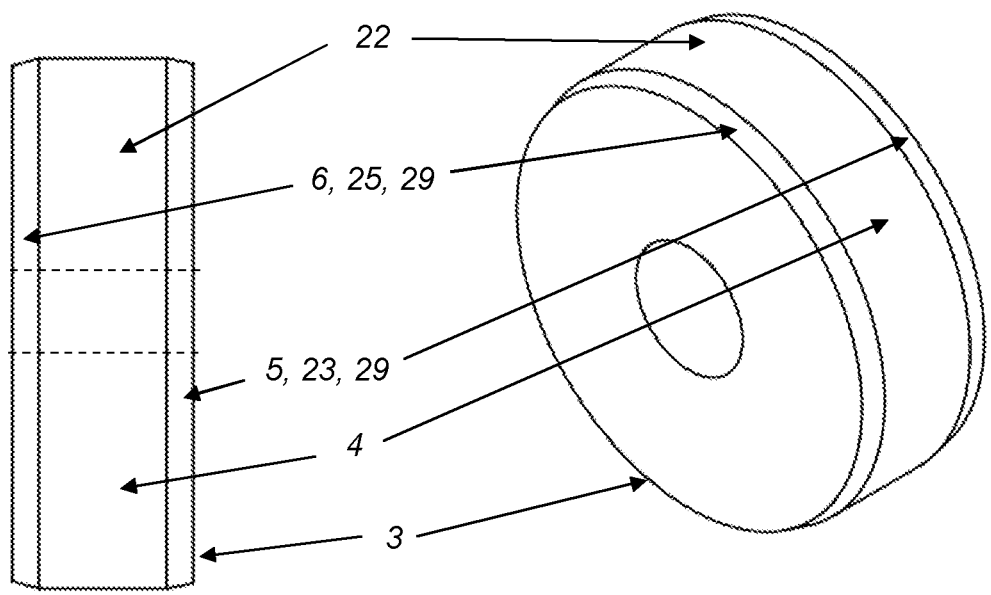
FIG. 9 schematically shows a front view and inlet of one example of a rotary die.
FIG. 10 schematically shows a perspective view of the rotary die in FIG. 9.

FIG. 9 schematically shows a front view of one example of a rotary die, and FIG. 10 schematically shows a perspective view of the rotary die in FIG. 9. In FIGS. 9 and 10, the mid-portion 22 of the rotary die is larger in diameter than the annular recesses 29 in the first and second side portions 23, 25. In FIG. 9, the recess 29 has a lesser radial extension compared to other parts of the rotating die 3 and a smooth transition from the mid-portion 22 to the recess 29 and a continuous smooth curvature from the mid-portion 22 throughout the recess 29 to the respective first side wall 5 and second side wall 6. The recess 29 could be arranged in the form of a step function or in the form of an indentation, i.e. an annular recess. The indentation could be arranged in the form of a 90 degree step, but the step can be arranged as an angled portion as depicted but can also have an arc shape, e.g. a concave recess. The angle of the angled portion can be between 1-90 degrees compared to the first side wall 5 and second side wall 6 respectively, with a radial decrease towards the first side wall 5 and second side wall 6 respectively.

The recesses or indentations 29 could also be annular concave surfaces that gives a local pressure decrease with reference to the adjacent mid-portion 22. Any combination is possible as long as the desired local pressure reduction compared to at least a part of the mid portion is achieved.

Figures 11, 12:
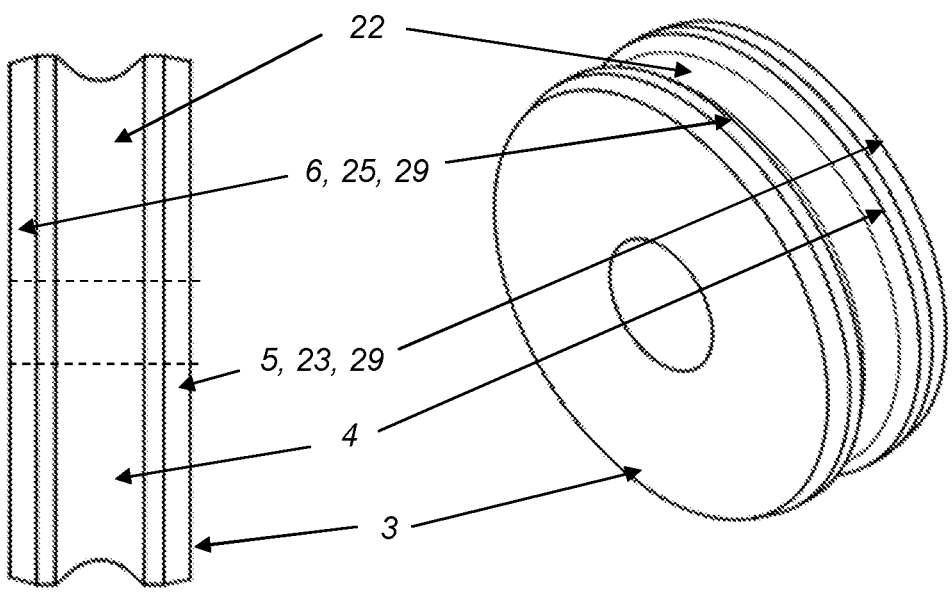
FIG. 11 schematically shows a front view and inlet of one example of a rotary die.
FIG. 12 schematically shows a perspective view of the rotary die in FIG. 11.

FIG. 11 schematically shows a front view of another example of a rotary die and FIG. 12 schematically shows a perspective view of the rotary die in FIG. 11. In FIGS. 11 and 12, the mid-portion 22 of the rotary die has a portion that is lesser in diameter than the annular recesses 29 in the first and second side portions 23, 25 but other portions of the mid portion 22 has a greater diameter than the annular recesses 29 in the first and second side portions 23, 25.

In FIGS. 1 and 5-20 it is shown that both the first and second side portions 23, 25 comprise annular recesses 29, but according to a different example (not shown) only one of the first and second side portions 23, 25 could comprise an annular recess 29.

FIGS. 1 and 5-20 show that at least a part/portion of the mid portion 22 has a diameter, i.e. an extension in the radial direction, being greater than the diameter, i.e. the extension in the radial direction, of the annular recess 29. One advantage of this difference in diameter is that material flowing in a direction towards the first side wall 5 and the second side wall 6 will lose momentum and speed due to the decrease in pressure in the annular recesses 29 in the first and second side portions 23, 25.

In FIGS. 1 and 5-20 the recesses 29 follow the contour of the mid-portion 22 which has the advantage of an even pressure decrease in that area. However, in another example (not shown) it is possible to have annular recesses with varying diameter different from the mid-portion, or annular recesses being rotation symmetric when the mid-portion has non-rotation symmetric portions.

FIGS. 1 and 5-20 show that the recesses 29 are rotation symmetric about an axis of the rotating die 3, but as stated above, other design is possible.

FIG. 5 shows that the walls 11 are static and define a first cross-section 12 at the end of the first channel section 9 and wherein the second channel section 10 defines a second cross-section 17 at a position where the distance D2 between the circumferential surface 4 and the counter-bearing 14 is at a minimum, and wherein the geometry of the first channel section 9 is different from the second channel section 10 such that the material passing through the first channel section 9 changes form when entering the second channel section 10.

The minimum distance D2 in the height direction Z between the circumferential surface 4 and the counter-bearing 14 in the second cross-section 17 is less than a maximum distance D1 in the height direction in the first cross-section 12. This has the advantage of forcing the material to change form and start flowing in various directions dependent on the shape and form of the rotating die 3 and shape and form of the counter-bearing 14 opposite the rotating die 3.

Due to the geometrical difference in the first channel section 9 and the second channel section 10, the pressure in the second channel section 10 is increased or maintained to such level that the material will transform fast enough to saturate the second channel section, including an imprint of the rotating die.

As stated in connection to the description of FIGS. 1 and 5-20, the local pressure reduction is achieved in connection to the first and/or second side portions 23, 25 due to the geometrical difference in the first and second channel sections 9, 10. The device 1 can be arranged without flange portions 18, 19 and annular recesses 29, but both the flange portions 18, 19 and annular recesses 29 are complementary strategies for leakage protection that gives added effect.

FIGS. 1 and 13-16 show strategies for local pressure reduction in combination with the annular recess(s) described in connection to FIGS. 1 and 5-20. As stated above different strategies can be combined as shown in FIG. 1 where the device 1 comprises flange portions 18, 19 and recesses 29. However, the strategies for local pressure reduction described above and in connection to FIGS. 1 and 13-16 can be arranged without the flange portions and annular recesses.

Figure 16:
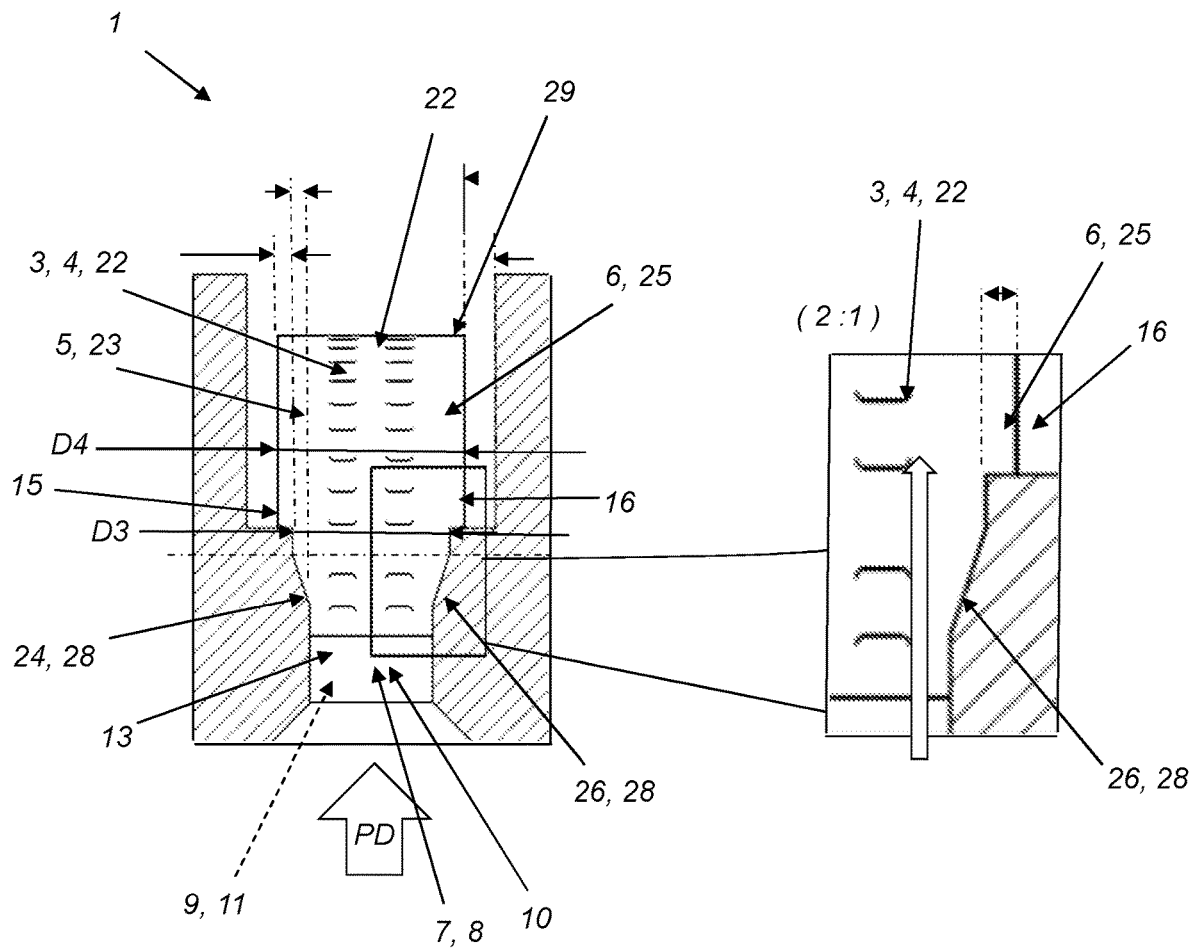
FIG. 16 schematically shows an enlarged view of a part of the device in FIG. 15.

FIG. 13 schematically shows a view from below along section A-A in FIG. 2 without the flange portions of a device according to the invention and FIG. 14 schematically shows an enlarged view of a part of the device in FIG. 13. FIG. 15 schematically shows a view from below along section A-A in FIG. 2 without the flange portions of a device according to one example of the invention and FIG. 16 schematically shows an enlarged view of a part of the device in FIG. 15.

In FIGS. 1 and 13-16 the first channel section 9 comprises a third side portion 24 extending in the width direction X, wherein the third side portion 24 is arranged in relation to the first side portion 23 such that a pressure in the material to be extruded is less in connection to the first side portion 23 than in connection to the third side portion 24,
and/or
wherein the first channel section 9 comprises a fourth side portion 26 extending in the width direction X, wherein the fourth side portion 26 is arranged in relation to the second side portion 25 such that a pressure in the material to be extruded is less in connection to the second side portion 25 than in connection to the fourth side portion 26.

FIGS. 1 and 13-16 shows that the first channel section 9 comprises leeward means 27 in connection to the third and/or fourth side portions 24, 26 arranged to decrease the space of the first channel section 9 in the height direction Z being perpendicular to the width direction X and wherein the first channel section 9 comprises leeward means 28 in connection to the third and/or fourth side portions 24, 26 arranged to decrease the space of the first channel section 9 in the width direction X.

As is shown in FIGS. 1 and 13-16, the leeward means 27, 28 comprises elevations facing into the through channel 8.

With reference to FIGS. 1-16, the second channel section 10 is advantageously arranged in relation to the first channel section 9 with a predetermined second distance D2, shown in FIG. 5, between the radially outermost portion of the circumferential surface 4 of the rotating die 3 and the counter-bearing 14 in the channel portion 13 being less than a predetermined first distance D1, shown in FIG. 5, between the most far apart portions of the first channel section 9 taken in a height direction Z coinciding with the radial direction,
and/or wherein:
the second channel section 10 is arranged in relation to the first channel section 9 with a predetermined fourth distance D4, shown in FIG. 15, between the innermost narrowest portions of the channel portion 13 in the width direction X being greater than a predetermined third distance D3, shown in FIG. 15, between side walls in the first channel section taken in the width direction X at the exit area from the first channel. This change in both height and width forces the material to reform and the narrower first channel section gives a locally decreased pressure when entering the channel section since the first and second side portions are in the wake, i.e. behind the side walls in the first channel.

Furthermore, with reference to FIGS. 1-16 the first and second side walls 5, 6 are positioned in relation to the first and second channel portion side walls 15, 16 such that the first and second side walls 5, 6 are rotatably connected to the first and second channel portion side walls 15, 16 with a tolerance arranged dependent on product material and the geometrical relation between the first and second channel sections 9, 10

The circumferential surface 4 may comprises a textured portion 30 that can cover all the rotating die but the annular recess portion, or the first side portion 4 comprises a non-textured portion 31 extending between the first flange portion 18 and the textured portion 30 and wherein the second side portion 25 comprises a non-textured portion 32 between the second flange portion 19 and the textured portion 30.

The non-textured portions 31, 32 advantageously has a radius less than a radius to an imprint depth of the textured portion 30, especially in the annular recess 19 portion.

However according to one example (not shown), the circumferential surface 4 can be non-textured but with a smooth surface or a micro-patterned surface. The non-textured rotating die can have a shape being cylindrical or undulating.

Figures 17, 18:
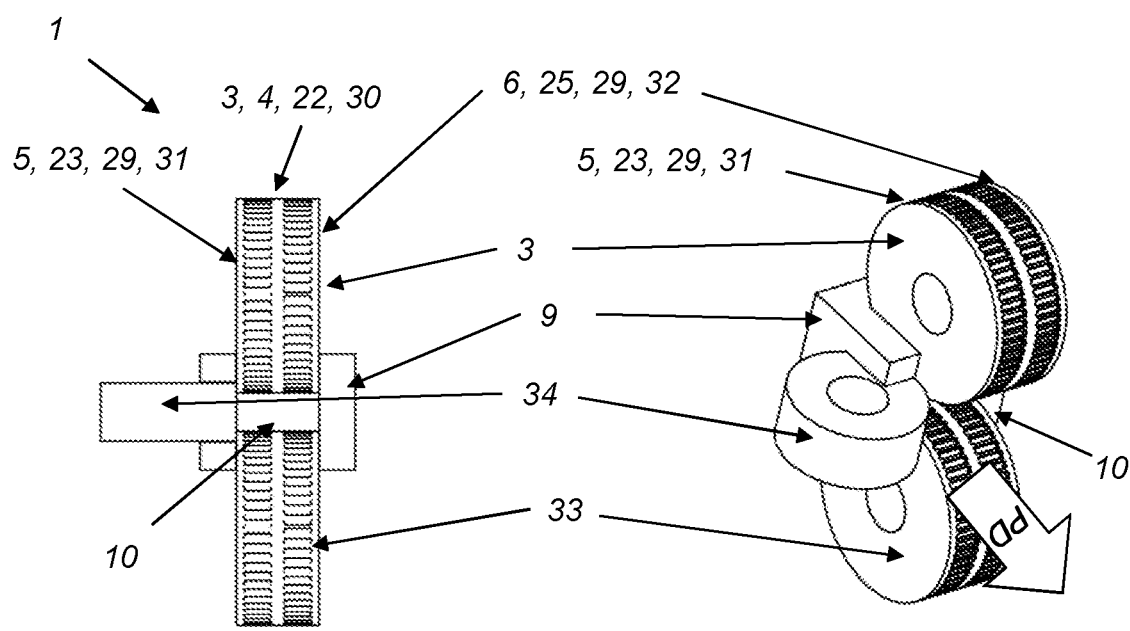
FIG. 17 schematically shows a back view and outlet of an assembly of rotary dies including three rotary dies.
FIG. 18 schematically shows a perspective view of an assembly according to FIG. 17.

FIG. 17 schematically shows a back view and outlet of an assembly of rotary dies 3 including three rotary dies, 3, 33, 34 and FIG. 18 schematically shows a perspective view of an assembly according to FIG. 14. With references to FIGS. 1-16, the channel portion 13 comprises a second rotating die 33 arranged opposite the first rotating die 3 replacing the counter-bearing 14 in FIGS. 1-16. The second rotating 33 die can either replace the counter-bearing 14 in its entirety or can be a part of a static counter-bearing 14 (not shown). The second rotating 33 die can be arranged in a similar way as the above described first rotating die 3 to create same or different patterns on two sides of the profile product. The second rotating die 33 can comprise annular recesses and/or flange portions that can be arranged to cooperate with annular recesses 29 and/or flange portions 18, 19 of the first rotating die 3.

According to one example shown in FIGS. 17 and 18, the channel portion 13 (shown in FIGS. 1-16) comprises a third rotating die 34 arranged at an angle to the first rotating die. This rotating die replaces the opposing first or second channel portion side wall 15, 16 entirely or partly. The third rotating die 34 can be arranged together with only the first rotating die or together with both the first and second rotating die. Hence, the above described arrangement with a first rotating die 3 and a second opposing rotating die 33 can be assembled without the third rotating die 34.

Figures 19, 20:
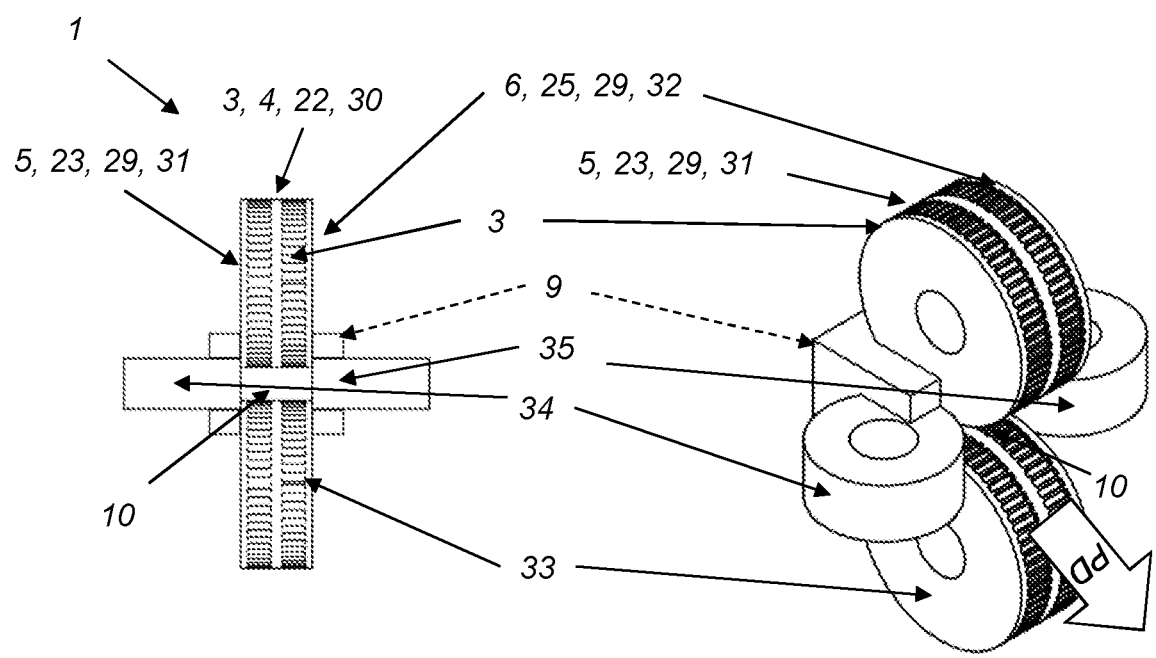

FIG. 19 schematically shows a back view and outlet of an assembly of rotary dies including four rotary dies, and wherein and FIG. 20 schematically shows a perspective view of an assembly according to FIG. 19. FIGS. 19 and 20 show that the channel portion 13 (shown in FIGS. 1-16) comprises a fourth rotating die 35 arranged opposite the third rotating die 34. The fourth rotating die 34 can as an alternative be arranged together with only the first rotating die 3 or together with both the first and second rotating die 3, 33.

The third and/or the fourth rotating die(s) 34, 35 can be arranged in a similar way as the above described first rotating die 3 to create same or different patterns on two sides of the profile product. The third and/or fourth rotating dies 34, 35 can comprise annular recesses and/or flange portions that can be arranged to cooperate with annular recesses 29 and/or flange portions 18, 19 of the first rotating die 3.

According to one example, two or more rotating dies are synchronised. This has the advantage of feeding the material at the same speed. However, it could be possible to also use non-synchronous rotating dies in order to create friction and/or a special pattern and/or to compensate for material differences.

The device can be arranged with a combination of textured and non-textured rotating dies 3; 33; 34; 35.

Figure 21:
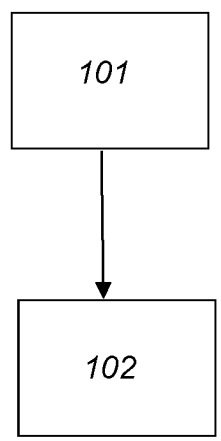
FIG. 21 schematically shows a flow chart of a method for producing a profile product by use of a device according to what has been described in connection to FIGS. 1-20.

FIG. 21 schematically shows a flow chart of a method for producing a profile product by use of a device according to what has been described in connection to FIGS. 1-21, wherein the method comprises the step shown in Box 101
feeding a material to the first channel section and forming the same in the first channel section, And the step shown in Box 102
feeding the material further to the second channel section and forming the same in the second channel section.

The figures showing recesses 29 show that the first and second side portions 23, 25 comprises an annular recess. According to one example, not shown, only one of the first or second side portions 23, 25 comprises a recess. In FIGS. 1-18, the recesses are annular recesses, i.e. extending circumferentially about the rotational axis. According to one example, not shown, the first and/or second side portions comprises one or more recesses not being annular but arranged as one ore many single recesses. Each single recess has an extension in the width direction, the rotation direction, i.e. the circumferential direction being perpendicular to the width direction, and the radial direction. The single recesses can have similar or different shape and are advantageously. The single recesses can be arranged in different patterns extending circumferentially about the rotational axis. The single recesses can be arranged in one single line of recesses extending circumferentially about the rotational axis or can be arranged as two or more lines of recesses arranged next to each other in the width direction. The two or more lines of recesses can be arranged such that one or more are arranged next to each other in the width direction or offset to each other in the circumferential direction. The different lines of single recesses can have same or different number of recesses.

The figures that show the first and second flange portions 18, 19 show that, the first and/or second outer circumferential surfaces 20, 21 are arranged with a smooth annular shape, i.e. the first and/or second flange portions are arranged with a circular or oval shape, but according to another example the first and/or second outer circumferential surfaces are arranged in an undulating manner, i.e. the first and/or second flange portions are arranged with a cogwheel like shape.

The invention claimed is:

1. An extrusion and/or pultrusion device for forming a profile product in a production direction, said device comprising:
    a rotating die, extending in a radial direction and a width direction, having two opposite first and second side walls and an outer circumferential surface extending in the width direction there between, wherein the rotating die comprises a first side portion in connection to the first side wall and a second side portion in connection to the second side wall and a mid-portion extending between the first and second side portions, and
    a profile definition zone having a longitudinal direction coinciding with the production direction, a height direction and the width direction being perpendicular to the height direction, comprising a through channel comprising a first channel section followed by a second channel section downstream the first channel section with reference to the production direction, wherein the rotating die is rotatable about an axis extending across the production direction and arranged to allow the outer circumferential surface to, while the rotating die rotates, exert a pressure onto a surface of a material when fed through the profile definition zone,
    wherein;
    the first channel section is circumferentially delimited by one or more walls
    and wherein
        the second channel section is circumferentially delimited by
        the circumferential surface of the rotating die and
        a channel portion comprising
            a counter-bearing opposite the rotating die and opposing first and second channel portion side walls between the rotating die and the counter-bearing
        wherein
        the width of the first channel section is, at least along a portion of its length and at least along a portion of its height, less than a distance between the two opposite side walls of the rotating die and wherein the first channel comprises, in in a longitudinal direction, a first width greater than a second width and a third width greater than the second width.

2. The device according to claim 1, wherein local pressure reduction is achieved in connection to the first and second side walls due to geometrical difference in the first and second channel sections.

3. The device according to claim 1, wherein the one or more walls define a first cross-section at an end of the first channel section and wherein the second channel section defines a second cross-section at a position where the distance between the circumferential surface and the counter-bearing is at a minimum, and wherein geometry of the first channel section is different from the second channel section such that the material passing through the first channel section changes form when entering the second channel section.

4. The device according to claim 3, wherein the minimum distance in the height direction between the circumferential surface and the counter-bearing in the second cross-section is less than a maximum distance in the height direction in the first cross-section.

5. The device according to claim 1, wherein geometrical difference in the first and second channel sections is arranged to give a pressure in the second channel section being increased or maintained to such level that the material will transform fast enough to saturate the second channel section, including an imprint of the rotating die.

6. The device according to claim 1, wherein the first channel section comprises a third side portion extending in the width direction, wherein the third side portion is arranged in relation to the first side portion such that a pressure in the material to be extruded is less in connection to the first side portion than in connection to the third side portion, and/or
    wherein the first channel section comprises a fourth side portion extending in the width direction, wherein the fourth side portion is arranged in relation to the second side portion such that a pressure in the material to be extruded is less in connection to the second side portion than in connection to the fourth side portion.

7. The device according to claim 6, wherein the first channel section comprises leeward means in connection to the third and/or fourth side portions arranged to decrease space of the first channel section in the height direction being perpendicular to the width direction.

8. The device according to claim 6, wherein the first channel section comprises leeward means in connection to the third and/or fourth side portions arranged to decrease space of the first channel section in the width direction.

9. The device according to claim 7, wherein the leeward means is an elevation facing into the through channel.

10. The device according to claim 1, wherein the second channel section is arranged in relation to the first channel section with a predetermined second distance between a radially outermost portion of the circumferential surface of the rotating die and the counter-bearing in the channel portion being less than a predetermined first distance between the most far apart portions of the first channel section taken in a height direction coinciding with the radial direction, and/or wherein:
the second channel section is arranged in relation to the first channel section with a predetermined fourth distance between an innermost narrowest portions of the channel portion in the width direction being greater than a predetermined third distance, between side walls in the first channel taken in the width direction at an exit area from the first channel section.

11. The device according to claim 1, wherein the first and second side walls are positioned in relation to the first and second channel portion side walls such that the first and second side walls are rotatably connected to the first and second channel portion side walls with a tolerance arranged dependent on product material and a geometrical relation between the first and second channel sections.

12. The device according to claim 1, wherein the first side portion comprises a first flange portion extending in the width direction and in the radial direction with an extension in the radial direction exceeding the radial extension of at least a part of the mid-portion and wherein the second side portion comprises a second flange portion extending the width direction and in the radial direction with an extension in the radial direction exceeding the radial extension of at least a part of the mid-portion.

13. The device according to claim 12, wherein the first flange portion comprises a first outer circumferential surface delimiting the first flange portion in a rotational direction and wherein the second flange portion comprises a second outer circumferential surface delimiting the second flange portion in the rotational direction.

14. The device according to claim 12, wherein first and second outer circumferential surfaces follow a contour of the mid-portion.

15. The device according to claim 12, wherein the first and second flange portions are rotationally symmetrical about an axis of the rotating die.

16. The device according to claim 1, wherein the first and/or second side portions comprises one or more recesses extending in the width direction and in the radial direction with an extension in the radial direction being less than a radial extension of at least a part of the mid-portion.

17. The device according to claim 16, wherein the recess follows a contour of the mid-portion.

18. The device according to claim 16, wherein the recess is rotationally symmetrical about the rotating axis of the rotating die.

19. The device according to claim 16, wherein the recess is either an indentation in the rotating die or a portion of the rotating die having a lesser radial extension compared to other parts of the rotating die.

20. The device according to claim 1, wherein the circumferential surface comprises a textured portion.

21. The device according to claim 20, wherein the first side portion comprises a non-textured portion extending between the first side wall and the textured portion and wherein the second side portion comprises a non-textured portion between the second side wall and the textured portion.

22. The device according to claim 21, wherein the non-textured portions have a radius less than a radius to an imprint depth of the textured portion.

23. The device according to claim 1, wherein the circumferential surface is non-textured.

24. The device according to claim 1, wherein the channel portion comprises a second rotating die arranged opposite the first rotating die.

25. The device according to claim 1, wherein the channel portion comprises a third rotating die arranged at an angle to the first rotating die.

26. The device according to claim 25, wherein the channel portion comprises a fourth rotating die arranged opposite the third rotating die.

27. The device according to claim 24, wherein two or more rotating dies are synchronised.

28. The device according to claim 24, comprising a combination of textured and non-textured rotating dies.

29. The device according to claim 1, wherein the first channel section is circumferentially delimited by static walls.

30. A method for producing a profile product by use of a device according to claim 1, wherein the method comprises
feeding a material to the first channel section and forming the same in the first channel section,
feeding the material further to the second channel section and forming the same in the second channel section.

* * * * *